United States Patent
Kolvick et al.

(10) Patent No.: US 10,125,635 B2
(45) Date of Patent: Nov. 13, 2018

(54) FIXTURE AND METHOD FOR INSTALLING TURBINE BUCKETS

(71) Applicant: General Electric Company, Schenectady, NY (US)

(72) Inventors: Sandra Beverly Kolvick, Simpsonville, SC (US); Kevin Leon Bruce, Greer, SC (US); Matthew Ryan Ferslew, Simpsonville, SC (US); Stuart Craig Hanson, Anderson, SC (US); Thomas Michael Merlau, Greenville, SC (US); Joshua Michael Oden, Greenville, SC (US); Christopher Michael Penny, Greer, SC (US)

(73) Assignee: General Electric Company, Schenectady, NY (US)

( * ) Notice: Subject to any disclaimer, the term of this patent is extended or adjusted under 35 U.S.C. 154(b) by 797 days.

(21) Appl. No.: 14/594,379

(22) Filed: Jan. 12, 2015

(65) Prior Publication Data

US 2016/0201556 A1    Jul. 14, 2016

(51) Int. Cl.
   *F01D 25/28*    (2006.01)
   *F02C 1/00*     (2006.01)
   *F01D 5/30*     (2006.01)

(52) U.S. Cl.
   CPC ........ *F01D 25/285* (2013.01); *F01D 5/3007* (2013.01); *F02C 1/00* (2013.01);
   (Continued)

(58) Field of Classification Search
   CPC ........ F01D 25/285; F01D 5/3007; F02C 1/00; F05D 2230/68; F05D 2230/70; F05D 2230/64
   See application file for complete search history.

(56) References Cited

U.S. PATENT DOCUMENTS

| 5,183,244 A | 2/1993 | Ortolano et al. |
| 5,737,816 A | 4/1998 | Hartmann et al. |

(Continued)

FOREIGN PATENT DOCUMENTS

| EP | 0745756 A1 | 12/1996 |
| EP | 2354456 A2 | 8/2011 |

(Continued)

OTHER PUBLICATIONS

European Search Report and Opinion issued in connection with corresponding EP Application No. 16150815.5 dated May 13, 2016.

*Primary Examiner* — Moshe Wilensky
(74) *Attorney, Agent, or Firm* — Ernest Cusick; Hoffman Warnick LLC

(57) ABSTRACT

A fixture and method for installing turbine buckets is disclosed. The fixture is adapted for mounting a plurality of turbine buckets with dovetails to a rotor wheel of a turbomachine that is separated from an adjacent rotor wheel by a spacer wheel, the rotor wheel and the spacer wheel each having a plurality of circumferentially aligned dovetail slots, the fixture includes: a turbine bucket holder having a dovetail that is configured to engage with one of the dovetail slots of the spacer wheel. The profile of a bucket holder dovetail slot substantially aligns the dovetail of the turbine bucket with a dovetail slot of the rotor wheel for at least partial transfer of a turbine bucket thereto.

8 Claims, 9 Drawing Sheets

(52) U.S. Cl.
CPC ...... *F05D 2230/64* (2013.01); *F05D 2230/68* (2013.01); *F05D 2230/70* (2013.01)

(56) References Cited

U.S. PATENT DOCUMENTS

| | | |
|---|---|---|
| 8,046,886 B2 | 11/2011 | DeMania et al. |
| 2011/0154631 A1* | 6/2011 | DeMania .............. F01D 5/3007 29/23.51 |
| 2014/0112794 A1 | 4/2014 | Garcia-Crespo et al. |

FOREIGN PATENT DOCUMENTS

| | | | |
|---|---|---|---|
| JP | 5578103 | A | 6/1980 |
| JP | 6011603 | A | 1/1985 |
| KR | 20130085213 | A | 7/2013 |

* cited by examiner

FIXTURE AND METHOD FOR INSTALLING TURBINE BUCKETS

BACKGROUND OF THE INVENTION

The present invention relates generally to turbomachines, and more particularly, to a fixture and a method for installing turbine buckets in dovetail slots of a rotor wheel by using a fixture and the dovetail slots of an adjacent spacer wheel.

Rotors for turbomachines such as turbines are often machined from large forgings. Rotor wheels cut from the forgings are typically slotted to accept the roots of turbine buckets for mounting. As the demand for greater turbine output and more efficient turbine performance continues to increase, larger and more articulated turbine buckets are being installed in turbomachines. Latter stage turbine buckets are one example in a turbine where buckets are exposed to a wide range of flows, loads and strong dynamic forces. Consequently, optimizing the performance of these latter stage turbine buckets in order to reduce aerodynamic losses and to improve the thermodynamic performance of the turbine can be a technical challenge.

Dynamic properties that affect the design of these latter stage turbine buckets include the active length of the buckets, the pitch diameter of the buckets and the high operating speed of the buckets in both supersonic and subsonic flow regions. Damping and bucket fatigue are other properties that have a role in the mechanical design of the buckets and their profiles. These mechanical and dynamic response properties of the buckets, as well as others, such as aero-thermodynamic properties or material selection, all influence the relationship between performance and profile of the turbine buckets. Consequently, the profile of the latter stage turbine buckets often includes a complex blade geometry for improving performance while minimizing losses over a wide range of operating conditions.

The application of complex blade geometries to latter stage turbine buckets presents certain challenges in assembling these buckets on a rotor wheel. For example, adjacent turbine buckets on a rotor wheel are typically connected together by cover bands or shroud bands positioned around the periphery of the wheel to confine a working fluid within a well-defined path and to increase the rigidity of the buckets. These interlocking shrouds may impede the assembly of buckets on the rotor wheel. In addition, inner platforms of these buckets may include tied-in edges, which also can impede their assembly on the rotor wheel.

BRIEF DESCRIPTION OF THE INVENTION

A first aspect of the present disclosure provides a fixture adapted for mounting a plurality of turbine buckets with dovetails to a rotor wheel of a turbomachine that is separated from an adjacent rotor wheel by a spacer wheel, the rotor wheel and the spacer wheel each having a plurality of circumferentially aligned dovetail slots. The fixture can include: a turbine bucket holder having a dovetail that is configured to engage with one of the dovetail slots of the spacer wheel, wherein the turbine bucket holder defines a bucket holder dovetail slot having a profile that is configured to receive and secure therein a dovetail of one of the turbine buckets, wherein the profile of the bucket holder dovetail slot substantially aligns the dovetail of the turbine bucket with a dovetail slot of the rotor wheel for at least partial transfer thereto from the spacer wheel, wherein the dovetail of the turbine bucket substantially aligns with a dovetail slot of the rotor wheel upon being secured in the bucket holder dovetail slot, a sidewall of the turbine bucket holder cooperatively engages a sidewall of a circumferentially adjacent turbine bucket holder, and wherein the dovetail of the turbine bucket is slidably removable from the bucket holder dovetail slot and guided for insertion into the dovetail slot of the rotor wheel.

A second aspect of the present disclosure provides a fixture for mounting a plurality of turbine buckets with dovetails to a rotor wheel of a turbomachine having a plurality of circumferentially aligned dovetail slots. The fixture can include: a spacer wheel, separating the rotor wheel from an adjacent rotor wheel, having a plurality of circumferentially aligned dovetail slots; a plurality of turbine bucket holders each having a dovetail that is configured to engage with one of the dovetail slots of the spacer wheel, wherein each of the plurality of turbine bucket holders includes a dovetail slot having a profile configured to secure therein a dovetail of one of the turbine buckets, wherein each profile of a bucket holder dovetail slot substantially aligns a dovetail of a turbine bucket with one dovetail slot of the rotor wheel for at least partial transfer thereto, wherein the dovetail of each turbine bucket aligns with a dovetail slot of the rotor wheel upon being secured in a bucket holder dovetail slot, and wherein essentially all dovetails of the turbine buckets are adapted to be slidably removed from a bucket holder dovetail slot and guided for insertion into one of the dovetail slots of the rotor wheel.

A third aspect of the present disclosure provides a method for mounting a plurality of turbine buckets having dovetails on a rotor wheel having a plurality of dovetail slots complementary to one of the dovetails of the turbine buckets. The method can include: loading dovetails of the plurality of turbine buckets into a corresponding plurality of bucket holder dovetail slots formed by inserting a plurality of turbine bucket holders in a spacer wheel, the spacer wheel including a plurality of circumferentially aligned dovetail slots and being mounted on a rotor shaft on one side of the rotor wheel, wherein each turbine bucket holder engages cooperatively within a dovetail slot of the spacer wheel and includes one of the plurality of bucket holder dovetail slots dimensioned to secure therein a dovetail of one of the turbine buckets; aligning each bucket holder dovetail slot of the spacer wheel that is loaded with a turbine bucket with one of the dovetail slots of the rotor wheel; and at least partially transferring each of the turbine buckets from the bucket holder dovetail slot to an aligned dovetail slot of the rotor wheel.

DETAILED DESCRIPTION OF THE INVENTION

Spatially relative terms, such as "inner," "outer," "beneath," "below," "lower," "above," "upper," "inlet," "outlet," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
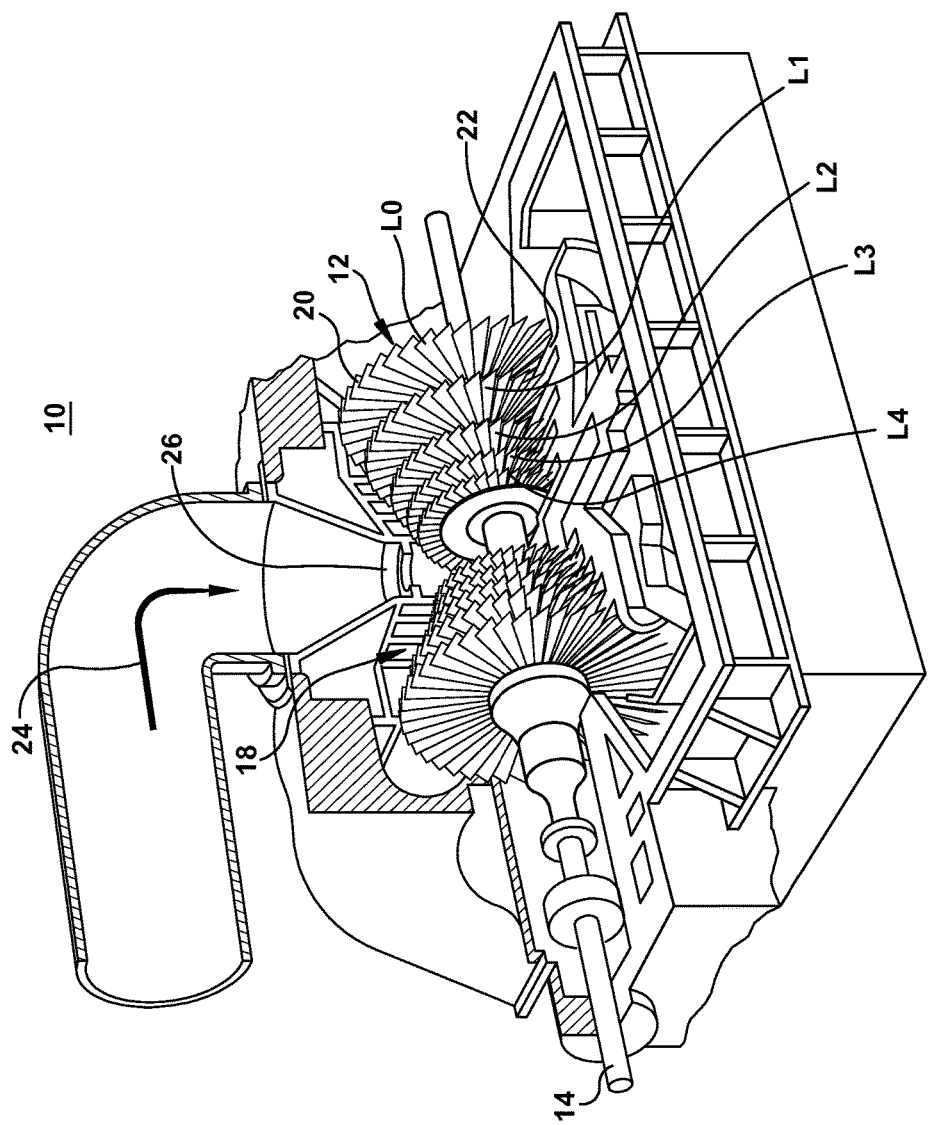
FIG. 1 is a schematic view of a conventional power generation system in the form of a gas turbine.

Referring to FIG. 1, a conventional power generation system 10 in the form of a turbomachine is shown. Embodiments of the present disclosure can be adapted for use with power generation system 10, e.g., an air-cooled gas turbine, and/or can be integrated into components thereof. Power generation system 10 is shown by example as being a combustion-based turbomachine assembly, though embodiments of the present disclosure can also be adapted for use with other types of turbomachines where applicable. In combustion-based turbomachines, a combustor 12 including a plurality of fuel nozzles 14 is typically located between a compressor 16 and a turbine component 18 of power generation system 10. Compressor 16 and turbine component 18 can be mechanically coupled to each other through a rotatable shaft 20.

Air 22 flows sequentially through compressor 16, combustor 12, and turbine component 18. The compression provided from compressor 16 can also increase the temperature of air 22. Fuel nozzle(s) 14 can provide fuel to combustor 12, where the fuel combusts in the presence of air 22 to yield a hot gas stream. The hot gas stream from combustor 12 can enter turbine component 18 to impart mechanical energy to rotatable shaft 20, e.g., by rotating a group of turbine buckets, thereby delivering power back to compressor 16 and/or any loads (not shown) mechanically coupled to rotatable shaft 20. Power generation system 10 may include a compressor inlet 24 preceding compressor 16, though which air can be provided to compressor 16 before being compressed and delivered to combustor 12. Although not shown specifically in FIG. 1, power generation system 10 can include multiple stages with respective combustors 12, compressors 16, and/or turbines 18. Power generation system 10 may in addition be one of several individual turbomachines controlled via the same operator and/or may be part of a larger power generation system.

Figure 2:
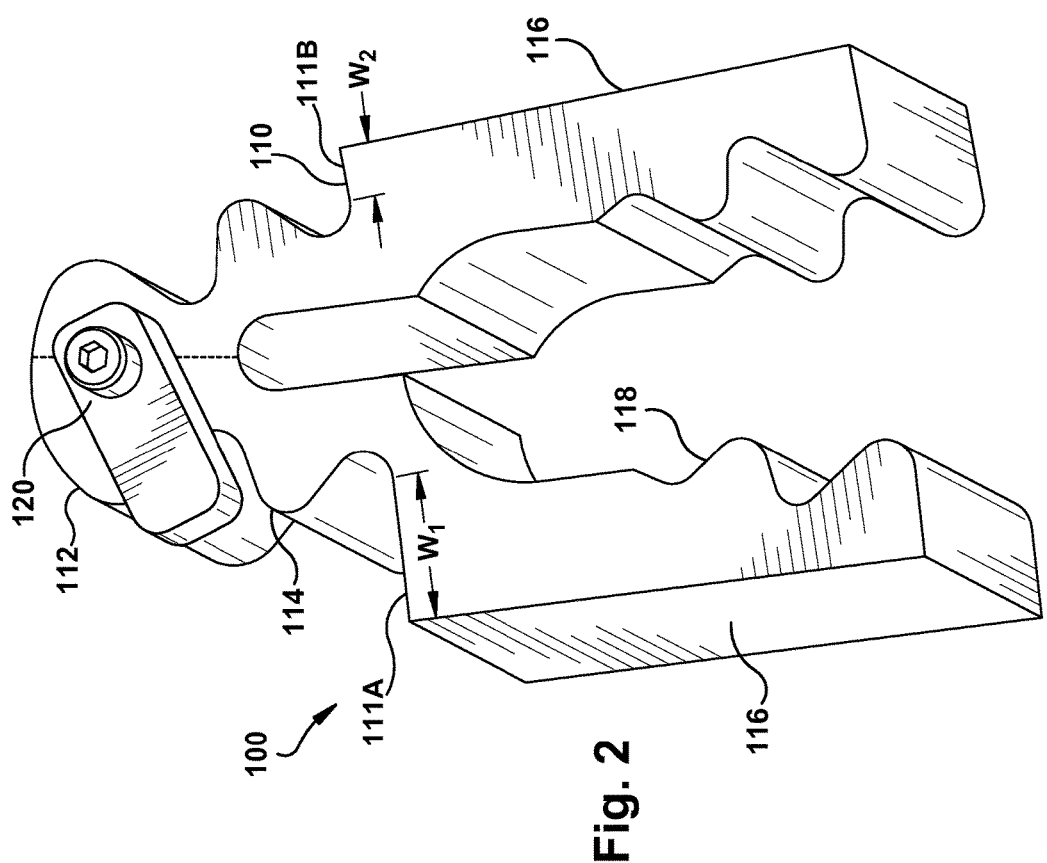
FIG. 2 is a cross-sectional illustration of a turbine bucket holder according to one embodiment of the present disclosure.

Referring to the drawings, FIG. 2 illustrates a fixture 100 adapted for mounting dovetail protrusions from turbine buckets (not shown in FIG. 2) to a rotor wheel (not shown) of a turbomachine. Several spacer wheels can separate each rotor wheel in a turbomachine from its axially adjacent rotor wheel. In operation, fixture 100 can engage a dovetail slot of a rotor wheel to provide a component and location where turbine buckets can be mounted and/or engaged. Turbine buckets with dovetail protrusions thereon can engage a complementary dovetail slot within fixture 100. Each turbine bucket can be mechanically coupled to the spacer wheel through fixture 100. The dovetail slots within fixture 100 can be substantially axially aligned (i.e., aligned substantially along the direction of the rotor) with similarly sized and profiled dovetail slots of rotor wheels adjacent to the spacer wheel. Turbine buckets can be at least partially axially transferred from fixture 100 to the dovetail slots of adjacent rotor wheels. As used herein, the term "transfer" or "axial transfer" refers to the process of moving (e.g., by sliding motion) a turbine bucket from one position to another, such as from between a dovetail slot within fixture 100 into a dovetail slot of an adjacent rotor wheel. Thus, embodiments of fixture 100 and other fixtures discussed herein can allow turbine buckets to be installed within a turbomachine without directly contacting a spacer wheel. Embodiments of the present disclosure also provide methods of installing turbine buckets by using embodiments of fixture 100.

Fixture 100 can include or be in the form of a turbine bucket holder 110, and by way of example a single turbine bucket holder 110 is shown in FIG. 2 and discussed herein. Example features of turbine bucket holder 110 are discussed to further illustrate its use with other components, including other turbine bucket holders 110. Turbine bucket holder 110 can be a unitary component or can be composed of multiple independent segments 111A, 111B contacting each other along a particular surface (shown in FIG. 2 with a phantom line). Independent segments 111A, 111B may form the profile of a turbine bucket holder when engaging another independent segment 111A, 111B. Turbine bucket holder 110 is shown in FIG. 2 as including two independent segments 111A, 111B, but it is understood that any desired number of independent segments can be used in embodiments of the present disclosure. Independent segments 111A, 111B can engage each other by physical contact between corresponding surfaces, welding, complementary manufacture or machining, and/or other processes for providing an adjacent placement or mechanical coupling between two components. Turbine bucket holder 110 can be composed of various structural materials to suit particular applications, and for example can be embodied as a plastic component, a metal component formed from or including steel, and/or a component with combinations of ceramic and/or metallic substances.

A dovetail 112 can extend from turbine bucket holder 110 and may be shaped, dimensioned, or otherwise configured to engage a dovetail slot of a spacer wheel positioned between two or more corresponding rotor wheels. The adjacent spacer wheels, in turn, can include several circumferentially aligned dovetail slots. Portions of turbine bucket holder 110 can extend laterally from dovetail 112 by a particular distance $w_1$ in one direction, and by another distance $w_2$ in a different direction. Distances $w_1$, $w_2$, can be substantially equal to each other or may differ by a predetermined value, such that turbine bucket holder 110 extends laterally further from dovetail 112 on one side than from an opposing side. In the example of FIG. 2, distance $w_1$ is shown by example as being substantially greater than $w_2$. In any event, distances $w_1$, $w_2$ being of different sizes can provide, e.g., a physical guide or reference for the orientation of turbine bucket holders 110 during installation, such that each turbine bucket holder 110 (and/or independent segments 111A, 111B thereof) will be installed in a particular direction and/or orientation.

As is discussed elsewhere herein, the dovetail slots of the spacer wheels may be at least partially aligned with the dovetail slots of one or more adjacent rotor wheels. Turbine bucket holder 110 can also include contours 114 on a surface of dovetail 112 to matingly engage corresponding dovetail slots within a spacer wheel where turbine bucket holder 110 is used. Two sidewalls 116 of turbine bucket holder 110 can be shaped to engage other turbine bucket holders 110 during operation, as is described elsewhere herein.

Turbine bucket holder 110 can include a dovetail slot 118 and other features for receiving, holding, and/or matingly engaging a contoured surface of a particular component, e.g., a turbine bucket dovetail protrusion. Dovetail slot 118 can be positioned between two sidewalls 116. As is shown in FIG. 2, dovetail 112 protruding above the innermost region of dovetail slot 118 in turbine bucket holder 110 can form a substantially C-shaped and/or Y-shaped component. A retention device 120 can optionally be provided upon, coupled to, and/or integral with turbine bucket holder 110. Retention device 120 can be in the form of one or more mechanical components for coupling one structure to another, including but not limited to: a retaining bolt, an adhesive, a rail, a solid bendable component, a coupling component, and/or other mechanical devices for retaining one component within and/or adjacent to another. In operation, retention device 120 can be moved to an actuated or locked position, e.g., contacting a spacer wheel, to obstruct or prevent axial motion of turbine bucket holder 110. These features of retention device 120 can secure turbine bucket holder 110 of fixture 100 in an installed position. Retention device 120 can extend through and/or be affixed to one or more axial sides of turbine bucket holder 110. In an embodiment, retention device 120 can be in the form of a rod extending axially through turbine bucket holder 110, and can include a point of manipulation (e.g., a handle) on a particular side to engage and/or disengage retention device 120. It is also understood that retention device 120 can be in the form of multiple components, whether complementary to or independent from one another.

Figure 3:
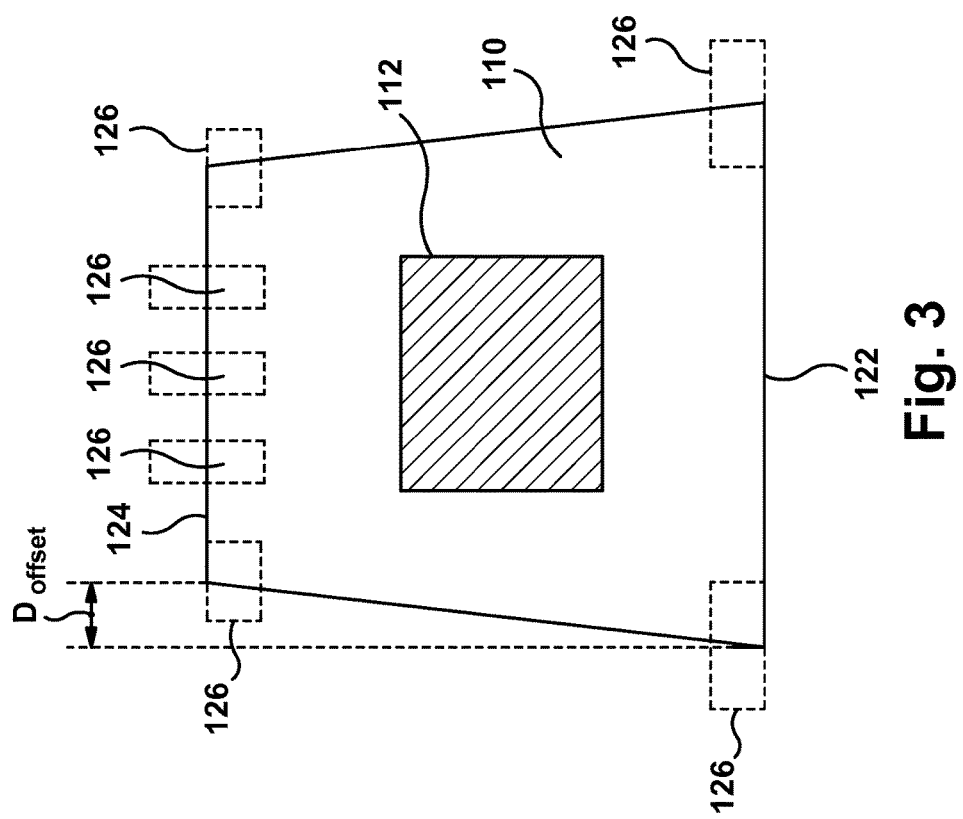
FIG. 3 is another cross-sectional illustration of a turbine bucket holder according to embodiments of the present disclosure.

Other features and components of turbine bucket holder 110 can provide or enhance mechanical coupling between turbine bucket holder 110 and a spacer wheel. As is shown by example in FIGS. 2 and 3, turbine bucket holder 110 can include a two independent segments 111A, 111B with corresponding distances $w_1$, $w_2$, and/or a first surface 122 (e.g., a front-facing surface) with a first width ($w_1$) and a second surface 124 (e.g., a back-facing surface) with a second width ($w_2$). The difference between the widths of independent segments 111A, 111B and/or first and second surfaces 122, 124 can create an "offset differential" (i.e., a difference in the size of between two corresponding and/or opposing surfaces, noted in FIG. 3 by $D_{offset}$) for maintaining a particular orientation of turbine bucket holder 110 when installed within a spacer wheel. In addition or alternatively, turbine bucket holder 110 can include interlocking fixtures 126 (shown in phantom), similar to those in a key or key-type device, for engaging complementary fixtures located on or within a turbine spacer wheel. In the example of FIG. 3, interlocking fixtures 126 are shown as protrusions from turbine bucket holder 110, but can alternatively be in the form of slots or ridges removed from and/or integral to the structure of turbine bucket holder 110. Interlocking fixtures 126 can preserve a desired orientation of turbine bucket holder 110 during installation to prevent, e.g., a backwards installation of turbine bucket holder 110.

Figure 4:
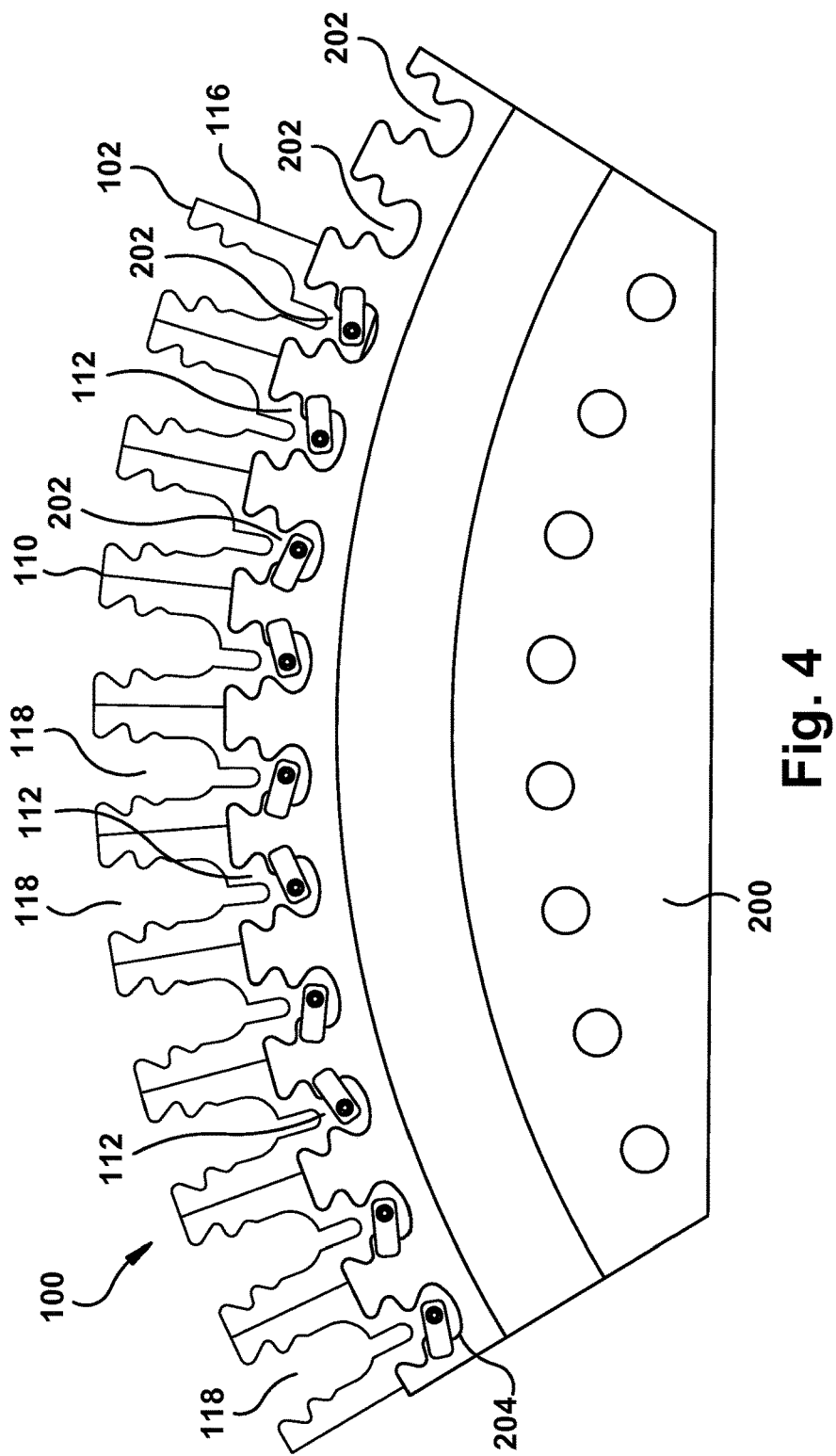
FIG. 4 is a perspective partial cut-away illustration of a spacer wheel with a plurality of circumferentially aligned dovetail slots and turbine bucket holders inserted therein according to one embodiment of the present disclosure.

Turning to FIG. 4, several turbine bucket holders 110 of fixture 100 engaging a spacer wheel 200 are shown. Each dovetail 112 of a particular turbine bucket holder 110 can be formed in a particular shape for engaging a corresponding dovetail slot 202 of spacer wheel 200, thereby allowing turbine bucket holders 110 to be arranged circumferentially about spacer wheel 200. In an example embodiment, dovetail 112 of turbine bucket holder 110 can include chamfered tip edges 204 with respect to the remainder of its structure. To complement dovetail 112, dovetail slots 202 can be in the form of chamfered slots removed from, etched into, or otherwise formed within the structure of spacer wheel 200. Where dovetail 112 includes chamfered tip edges 204, dovetail slots 202 may be in the shape of complementary slots, fixtures, etc., for receiving dovetail 112 and/or similarly profiled components. Turbine bucket holders 110 can receive and secure a turbine bucket within their respective dovetail slots 118, thereby allowing portions of each turbine bucket to be secured to spacer wheel 200 through one or more turbine bucket holders 110 of fixture 100.

Each dovetail slot 202 of spacer wheel 200 may be spaced apart or otherwise positioned for substantial alignment with corresponding dovetail slots of a rotor wheel, thereby allowing dovetail slots 118 to be substantially aligned or otherwise continuous with corresponding dovetail slots of the adjacent rotor wheel. As used herein, the term "substantial alignment" or "substantially aligned" refers to any alignment between two components (e.g., slots) which permits a single component (e.g., a turbine bucket dovetail) to extend through and/or be transferred between dovetail slots 118 of turbine bucket holder 110 and other dovetail slots without first being treated or modified. In embodiments of the present disclosure, substantial alignment between dovetail slots 118 of turbine bucket holders 110 and dovetail slots of adjacent rotor wheels can allow a turbine bucket to be positioned within and at least partially transferred to dovetail slots 118 of turbine bucket holder 110 when the turbine bucket is positioned between two rotor wheels.

Following the placement of turbine bucket holders 110 within dovetail slots 202 of spacer wheel 200, sidewalls 116 of turbine bucket holders 110 can cooperatively engage each other (e.g., by direct or indirect contact) to secure and maintain each turbine bucket holder 110 upon spacer wheel 200. Fixture 100 can be embodied as a plurality of turbine bucket holders 110 with corresponding dovetail slots spaced circumferentially about a radially outer periphery of spacer wheel 200. Each turbine bucket holder 110 and/or its independent segments 111A, 11 1B (FIG. 2) can be independent from another, and any quantity of turbine bucket holders 110 can be provided. Turbine bucket holders 110 can, together, make up an arcuate segment of a particular element (e.g., a spacer wheel), and/or a complete circumferential group of turbine bucket holders 110. Turbine bucket holders 110 can be independent from one another and/or connected by bolted joints, welding, complementary machining and/or manufacture of each turbine bucket holder 110 (or segments thereof), etc. A group of turbine buckets can be installed within each circumferentially positioned turbine bucket holder 110 of fixture 100.

Turbine bucket holder 110 can include features for enhancing its use and/or engagement with spacer wheel 200. For example, dovetail slots 202 of spacer wheel 200 may be dimensioned to allow sliding movement and/or engagement in several dimensions or in only one dimension, such that turbine bucket holder 110 of fixture 100 can be inserted or removed as needed. Offset differential $D_{offset}$ (FIG. 3) and interlocking fixtures 126 (FIG. 3) can further define a point at which turbine bucket holder 110 is fully inserted into a particular dovetail slot 202, and can obstruct sliding movement and/or engagement in an improper direction or past a predetermined limit. Some turbine bucket holders 110 can feature dovetail slots 118 of varying shapes, sizes, widths, etc. In this case, turbine bucket holders 110 modified or substituted for turbine bucket holders 110 with different dovetail slots 118 as desired for particular applications. As is further shown in FIG. 5, a profile of one or more dovetail slots 118 in turbine bucket holder 110 can provide an axial view of corresponding dovetail slots in a rotor wheel adjacent to spacer wheel 200 when turbine bucket holders 110 are received therein.

Figure 5:
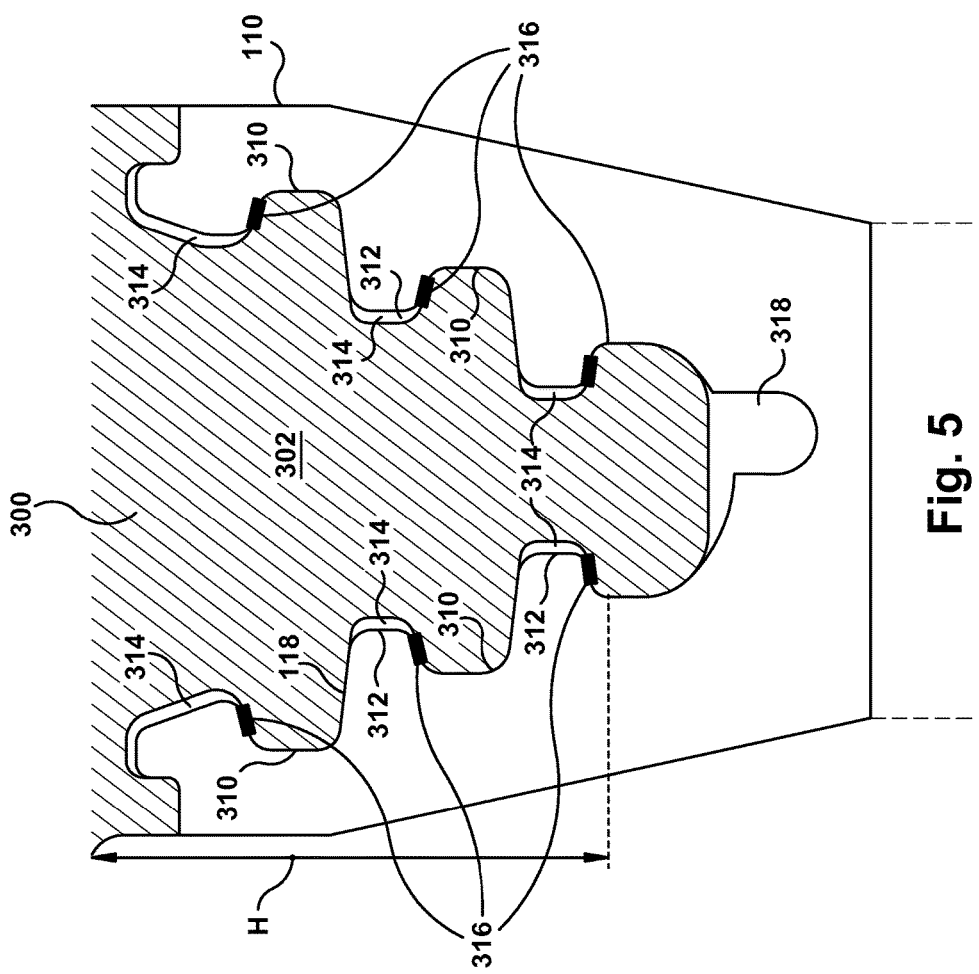
FIG. 5 is a partial cross-sectional view of a turbine bucket dovetail and a turbine bucket holder dovetail slot according to an embodiment of the present disclosure.

In FIG. 5, geometrical features of the engagement between a turbine bucket 300 and turbine bucket holder 110 are shown. FIG. 5 includes a cross-sectional view of turbine bucket holder 110 engaging a turbine bucket 300 by receiving a dovetail protrusion 302 within dovetail slot 118. During operation of a turbine with turbine bucket holder 110 and turbine bucket 300, turbine bucket 300 can move (e.g., by rotation) as a type of blade when actuated by a flow of fluid against its surface. Dovetail slot 118 of turbine bucket holder 110 can include a profile with a substantially undulating or "fir tree" shape with multiple necks 310 alternating with hooks 312 (e.g., in the form of protrusions or similar surfaces) for engaging similarly contoured surfaces of turbine bucket 300, with or without direct contact between the two components throughout dovetail slot 118. Each neck 310 can include a substantially planar contact surface for engaging a dovetail of turbine bucket 300. Although dovetail slot 118 is shown by example as substantially complementing a cross-section of turbine bucket 300, it is understood that dovetail slot 118 can be of any desired shape or geometry, e.g., a substantially v-shaped slot, one or more triangular wedges, a rectangular or semicircular slot, a slot formed in the shape of a composite geometry, etc.

Several hooks 312 can include non-contacting portions (e.g., surfaces) separated from the dovetail of turbine bucket 300 when turbine bucket holder 110 engages turbine bucket 300. These non-contacting portions can define a group of pockets 314 between turbine bucket holder 110 and turbine bucket 300. Pockets 314 can protect portions of dovetail slot 118 of turbine bucket holder 110 from damage caused by, e.g., manufacturing variances between turbine buckets 300, vibratory motion or damage, external shocks and events, frictional contact between the two components, etc. Pockets 314 can be formed, e.g., by removing portions of material from turbine bucket holder 110 and/or otherwise manufacturing or modifying turbine bucket holders 110 to define pockets 314. Among other things, pockets 314 can prevent turbine bucket holder 110 from contacting turbine bucket 300 at sensitive locations. In operation, turbine bucket holder 110 and turbine bucket 300 can engage each other at a group of contacting surfaces 316 distributed throughout dovetail slot 118 and turbine bucket 300. Pockets 314 can also be formed by manufacturing, modifying, and/or otherwise machining turbine bucket 300 to create separation between turbine bucket 300 and dovetail slot 118.

Dovetail protrusion 302 may include a height dimension H of lesser magnitude than a corresponding height dimension of dovetail slot 118. These differing heights can create a spacing differential between the two components and define a window space 318. Although one window space 318 is shown by example in FIG. 5, it is understood that multiple window spaces 318 can be defined between turbine bucket holder 110 and turbine bucket 300 in embodiments of the present disclosure. It is also understood that pockets 314 can also function as an at least partial window for providing view between turbine bucket holder 110 and turbine bucket 300 where applicable. Window space 318 can be present between dovetail slot 118 and dovetail protrusion 302 when dovetail protrusion 302 is installed within turbine bucket holder 110. Window space 318 can provide an axial view of an aligned dovetail slot of a rotor wheel (not shown) when dovetail protrusion 302 is positioned and/or secured within dovetail slot 118. Turbine bucket 300 is shown to include dovetail protrusion 302 and turbine bucket holder 110 is shown to include dovetail slot 118 by example in FIG. 5. In alternative embodiments, turbine bucket holders 110 may include a dovetail slot instead of dovetail protrusion 302. In this case, turbine bucket holder 110 may be modified or inverted to permit engagement between a complementary dovetail protrusion (e.g., dovetail 112 (FIG. 2)) from turbine bucket holder 110 and the dovetail slot of turbine bucket holder 300 in the alternative embodiment. When these modification and/or alternatives are present, other features discussed herein can be modified appropriately and/or remain the same.

Figure 6:
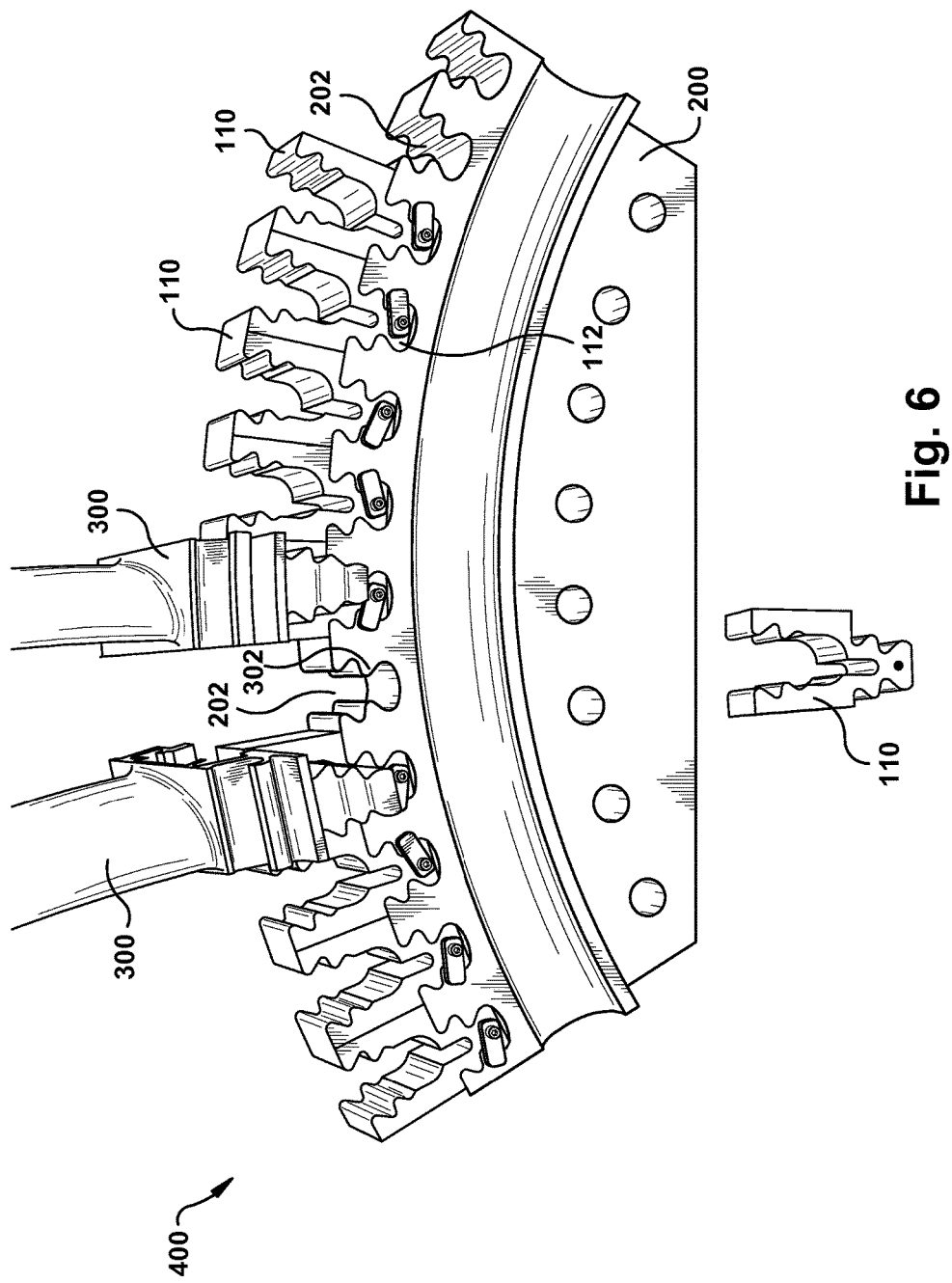
FIG. 6 is a perspective partial cut-away illustration of a spacer wheel with turbine bucket holders in several dovetail slots and turbine buckets in some of the turbine bucket holders according to one embodiment of the present disclosure.

Turning to FIG. 6, embodiments of the present disclosure can include a fixture 400 for mounting several turbine buckets with dovetails onto a rotor wheel. Fixture 400 can include or connect to one or more spacer wheels 200 positioned between two circumferentially adjacent rotor wheels (not shown). Circumferentially adjacent turbine bucket holders 110 can cooperatively engage with each other, e.g., by contact between their sidewalls 116 (FIGS. 1, 3). Each spacer wheel 200 can include a plurality of circumferentially aligned dovetail slots 202 distributed circumferentially throughout its outer radial surface. Fixture 400 can include several turbine bucket holders 110 engaging dovetail slots 202 of spacer wheel 200 by way of dovetails 112 thereon. Dovetail slots 118 of turbine bucket holders 110 can be radially displaced from dovetails 112 relative to spacer wheel 200. Dovetail slots 118 of each turbine bucket holder 110 can be shaped and/or dimensioned to secure dovetail protrusion 302 of turbine bucket 300 therein. Turbine bucket holders 110 can engage spacer wheel 200 as shown in FIG. 6, and optionally can include features defined by separation distance between spacer wheel 200 and one or more turbine bucket holders 110, e.g., pockets and window spaces similar to those shown and discussed herein (e.g., pockets 314 (FIG. 3) and window spaces 318 (FIG. 3).

Several turbine buckets 300 with dovetail protrusions 302 thereon can be installed within and/or coupled to fixture 400. Dovetail protrusions 302 may be shaped, dimensioned, etc., to engage with one of the several dovetail slots 202 of spacer wheel 200. Where dovetail protrusions 302 of turbine buckets 300 engage dovetail slots 118, a mechanical coupling between turbine buckets 300 and spacer wheel 200 can be formed. The mechanical coupling of turbine bucket 300 to spacer wheel 200 through turbine bucket holder 110 can prevent, e.g., direct physical contact between spacer wheel 200 and each turbine bucket 300. The mechanical coupling through turbine bucket holder 110 can also create axial alignment between turbine buckets 300 and complementary components of a rotor wheel.

Figure 7:
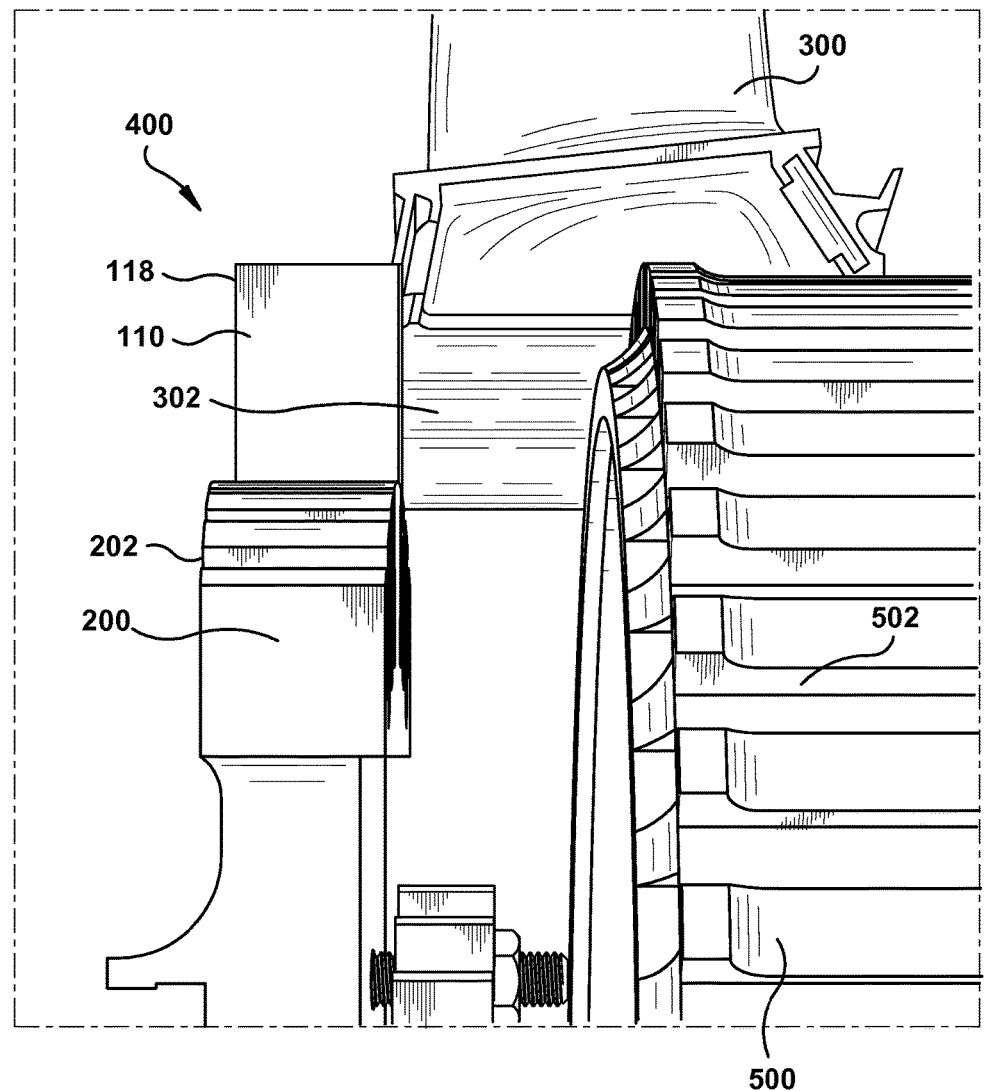
FIG. 7 is a side illustration of a spacer wheel with a turbine bucket holder adjacent a rotor wheel, and a turbine bucket being loaded from the turbine bucket holder of the spacer wheel to a dovetail slot of the rotor wheel according to one embodiment of the present disclosure.

Turning to FIG. 7, an embodiment of fixture 400 and a rotor wheel 500 is shown. Dovetail slots 118 of turbine bucket holders 110, when engaging spacer wheel 200, can be positioned in at least substantial alignment with corresponding dovetail slots 502 of rotor wheel 500. The shape and/or dimensions of dovetail slots 118 of turbine bucket holder 110 can provide a channel for guided insertion of turbine bucket 300 into fixture 400 and dovetail slots 502 of rotor wheel 500. In operation, fixture 400 can structurally support turbine bucket 300 and permit at least partial transfer to rotor wheel 500. Dovetail slots 118 of each turbine bucket holder 110 can be substantially aligned with dovetail slots 502 of rotor wheel 500 after fixture 400 is installed. Turbine bucket 300 can move, such as by sliding motion, between dovetail slots 118, 502 of turbine bucket holder 110 and rotor wheel 500.

Several turbine bucket holders 110 of fixture 400 can be interconnected or in contact with each other. That is, turbine bucket holders 110 can contact with each other at adjacent sidewalls 116 (FIGS. 1, 3) or interlocking fixtures 126 (FIG. 3), coupling components, etc., provided thereon. Fixture 400 can also include one or more retention devices 120 (FIG. 2) coupled to, e.g., turbine bucket holder 110 or spacer wheel 200, to secure turbine bucket 300 to fixture 400 (e.g., at spacer wheel 200) and rotor wheel 500. Dovetail slots 502 of rotor wheel 500, in addition to dovetail slots 118 of turbine bucket holders 110, can include at least some of the geometrical features shown in FIG. 5 and discussed elsewhere herein. Specifically, dovetail slots 118, 502 can be in the form of an undulating or "fir tree" shape with multiple necks 310 (FIG. 5) and hooks 310 (FIG. 5) thereon for engaging dovetail protrusions 302 of turbine buckets 300 at corresponding planar surfaces. Dovetail slots 118, 502 can also be profiled and/or dimensioned to define one or more pockets 314 (FIG. 5) between dovetail slots 118, 502 and dovetail protrusion 302 of turbine bucket 300 to protect corresponding portions of dovetail slots 118, 502. It is understood that embodiments of the present disclosure can be adapted for rotor wheels 500 configured for different types of turbine buckets 300, such as curved (i.e., non-planar) axial entry turbine buckets (not shown). The shape, axial profile, and/or orientation of dovetail slots 118 of turbine bucket holders 110 can be modified for this application where applicable.

Figure 8:
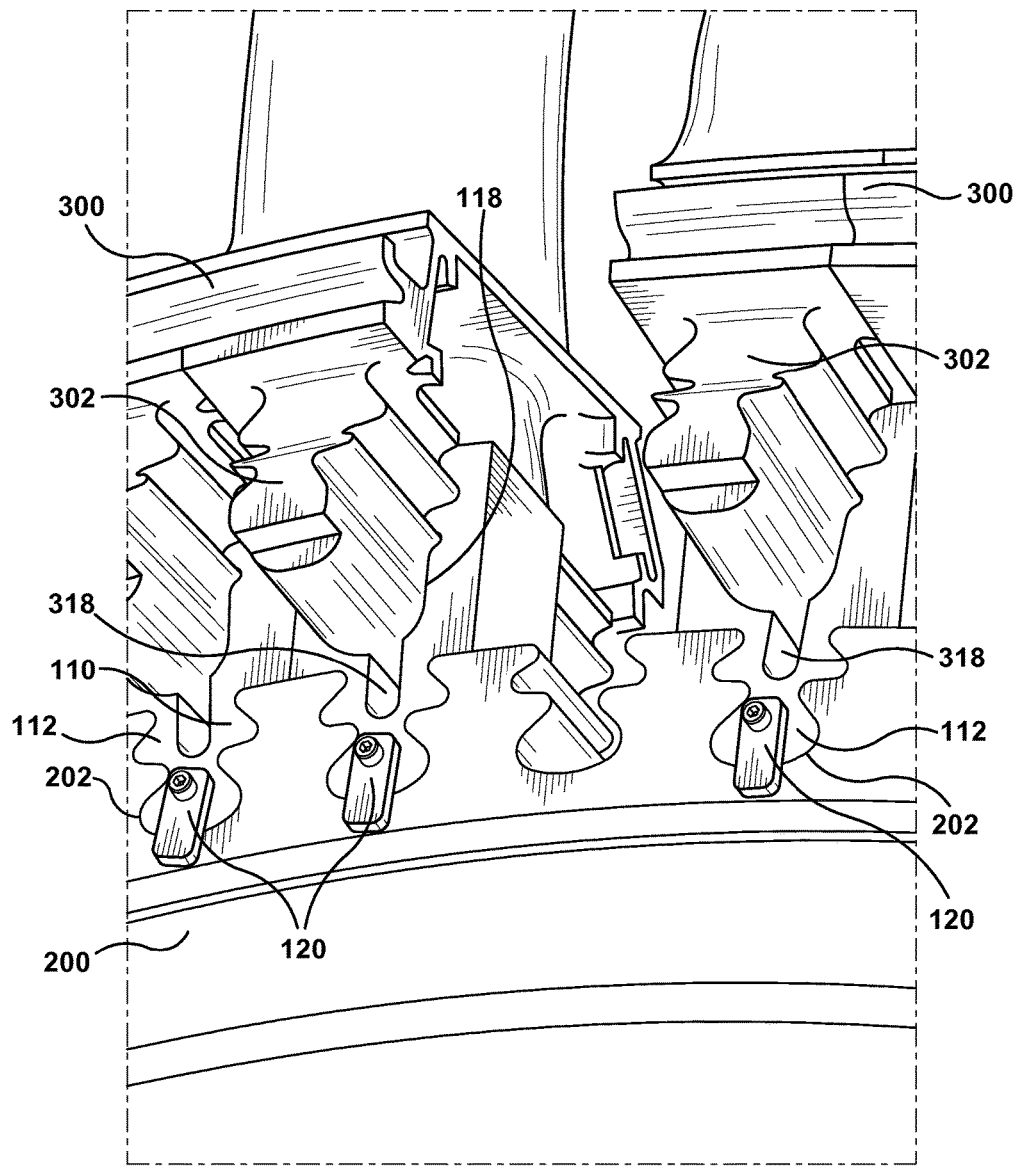
FIG. 8 is a perspective partial cut-away illustration of a spacer wheel with one dovetail slot without a turbine bucket holder and a turbine bucket therein according to one embodiment of the present disclosure.

Turning to FIG. 8, embodiments of the present disclosure provide methods for installing turbine buckets within and/or onto a rotor wheel. More specifically, methods according to the present disclosure can including mounting several turbine buckets 300, with dovetail protrusions 302 onto rotor wheel 200. Dovetail slots 202 of rotor wheel 200 can be sized, dimensioned, etc., to complement dovetail protrusion 302 of one of the turbine buckets 300. Dovetail protrusions 302 of several turbine buckets 300 can each be loaded into a corresponding dovetail slot 118 (e.g., in an axial direction) of one turbine bucket holder 110. Dovetails 112 of each turbine bucket holder 110 can be inserted into one of several dovetail slots 202 positioned circumferentially about spacer wheel 200. Methods of the present disclosure can include securing one or more turbine bucket holders 110 to spacer wheel 200, e.g., by actuating and/or locking retention devices 120 coupled to spacer wheel 200 or turbine bucket holders 120. Each dovetail slot 202 of spacer wheel 200 may be radially displaced from corresponding dovetail slots 502 (FIG. 7) and positioned circumferentially about rotor wheel 500 (FIG. 7). Each turbine bucket holder 110 can cooperatively engage a corresponding dovetail slot 202 via dovetail 112, thereby securing dovetail protrusions 302 of turbine buckets 300 to the radial position of dovetail slots 202 of spacer wheel 200.

Figure 9:
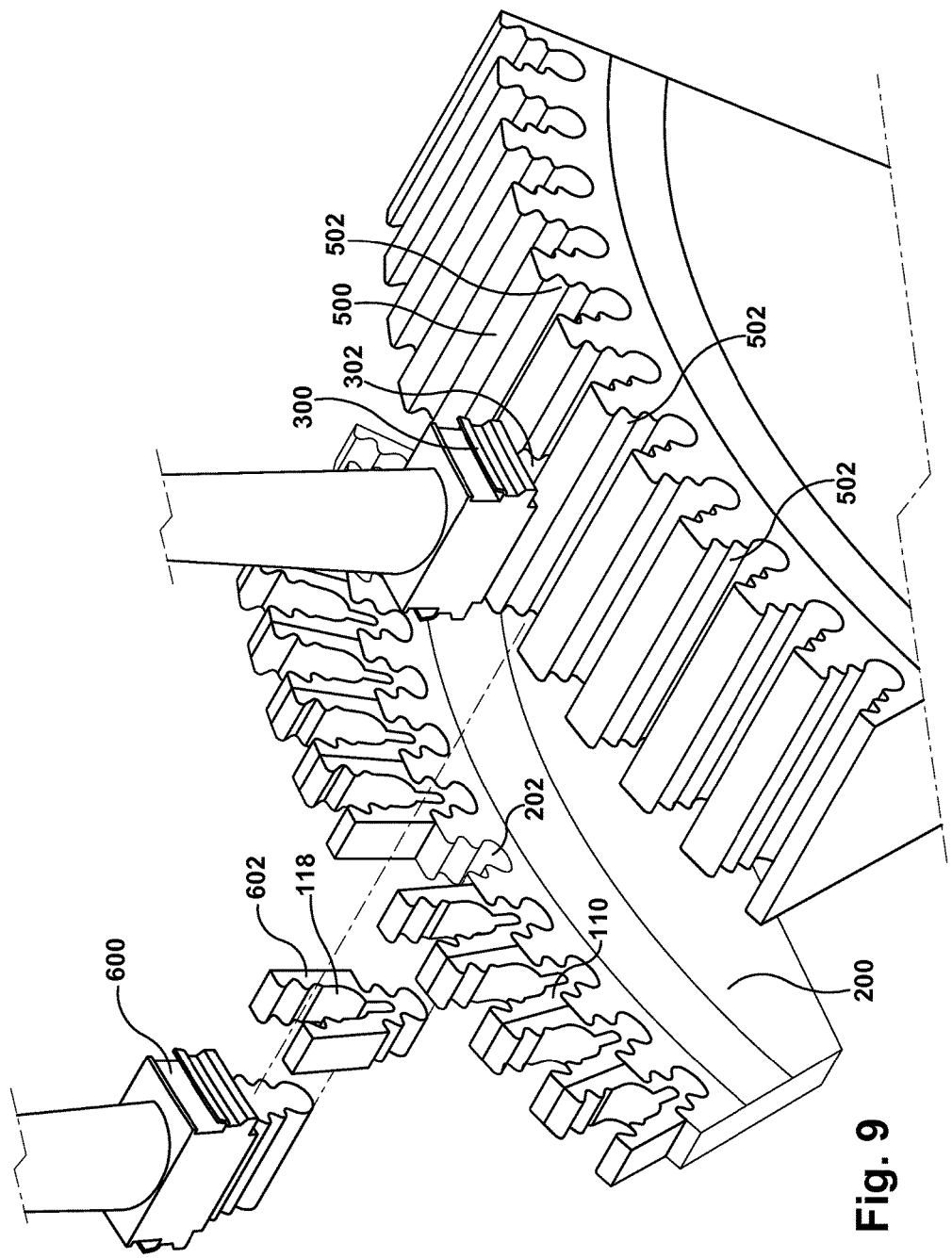
FIG. 9 is a perspective partial cut-away illustration of a rotor wheel with one dovetail slot having a final turbine bucket being radially inserted according to one embodiment of the present disclosure.

Turning to FIG. 9, other method steps according to embodiments of the present disclosure are shown. Following the loading steps shown in FIG. 8 and discussed elsewhere herein, dovetail slots 118 of each turbine bucket holder 110 with turbine bucket 300 therein can be at least substantially aligned with a particular dovetail slot 502 of rotor wheel 500. Creating at least substantial alignment between dovetail slots 118, 502 can allow turbine buckets 300 to be at least partially transferred to rotor wheel 500 from turbine bucket holders 110 in a further process step. Specifically, methods according to the present disclosure can include at least partially transferring turbine buckets 300 from turbine bucket holders 110 into an aligned dovetail slot 504 or rotor wheel 500 (e.g., by axial movement).

Methods according to the present disclosure can include loading turbine buckets 300 onto turbine bucket holders 110 and at least partially transferring turbine buckets 300 onto rotor wheel 500 in a predetermined order or manner. The steps discussed herein for loading and at least partially transferring turbine buckets 300 can be repeated until one dovetail slot 202 (FIGS. 3, 5-8) of rotor wheel 200 (FIGS. 3, 5-8) remains open at a particular loading space. A final turbine bucket 600 can be loaded and at least partially to rotor wheel 500 initially without the use of turbine bucket holder 110. Final turbine bucket 600 can be at least partially transferred to dovetail slot 502 of rotor wheel 500 by being inserted, radially inward, between two turbine buckets 300 such that final turbine bucket is spatially displaced from the last vacant dovetail slot 202 of rotor wheel 200. A final turbine bucket holder 602 can then be axially inserted into the gap between dovetail slot 202 of spacer wheel 200 and final turbine bucket 600, such that final turbine bucket 600 is structurally supported by both final turbine bucket holder 602 and rotor wheel 500.

Embodiments of the present disclosure can provide several technical and commercial settings, some of which are discussed herein by way of example. Embodiments of the fixtures and methods discussed herein can provide substantially uniform manufacturing and/or assembly of rotating components, such as those used in turbomachines. Embodiments of the present disclosure can also be employed for processes and/or events requiring at least partial disassembly of a rotating component and/or turbine stage, such as during the inspection of a hot gas path section of particular components (e.g., stage three buckets of a steam or gas turbine). The application of a fixture with turbine bucket holders furthermore can allow turbine buckets to be installed and removed without the rotor first being extracted from its casing. It is also understood that embodiments of the present disclosure can provide advantages and features in other operational and/or servicing contexts not addressed specifically herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fixture for mounting a plurality of turbine buckets with dovetails to a rotor wheel of a turbomachine having a plurality of circumferentially aligned dovetail slots, the fixture comprising:
    a spacer wheel, separating the rotor wheel from an adjacent rotor wheel, having a plurality of circumferentially aligned dovetail slots;
    a plurality of turbine bucket holders each having:
        a body;
        a dovetail protruding radially inward from the body with respect to a rotor of the turbomachine, and oriented axially in parallel with the rotor of the turbomachine, such that the dovetail protrusion is configured to engage with one of the dovetail slots of the spacer wheel; and
        a bucket holder dovetail slot within the body and substantially radially aligned with the dovetail of the turbine bucket holder, the bucket holder dovetail slot being oriented axially in parallel with the rotor of the turbomachine and having a profile configured to secure therein a dovetail of one of the turbine buckets, wherein each profile of a bucket holder dovetail slot substantially aligns a dovetail of a turbine bucket with one dovetail slot of the rotor wheel for at least partial transfer thereto, the bucket holder dovetail slot having a greater circumferential width than the dovetail slot of the rotor wheel;
    wherein the dovetail of each turbine bucket aligns with a dovetail slot of the rotor wheel upon being secured in a bucket holder dovetail slot, and wherein essentially all dovetails of the turbine buckets are adapted to be slidably removed from a bucket holder dovetail slot and guided for insertion into one of the dovetail slots of the rotor wheel.

2. The fixture of claim 1, wherein the body of one of the plurality of turbine bucket holders comprises a plurality of independent segments coupled to each other at a respective surface thereof, along a centerline axis of the dovetail and the bucket holder dovetail slot, to form a profile of the turbine bucket holder, each of the pair of independent segments having a different circumferential width with respect to the other of the pair of independent segments.

3. The fixture of claim 1, further comprising a plurality of retention devices, each coupled to one of the spacer wheel or one the turbine bucket holders of the plurality, wherein each of the plurality of retention devices includes a rotatable member having a length greater than the bucket holder dovetail slot, and secures a turbine bucket holder to the spacer wheel.

4. The fixture of claim 1, wherein each profile of a bucket holder dovetail slot includes a window space that provides a view of a dovetail slot of the rotor wheel upon securing a dovetail of the turbine bucket therein.

5. The fixture of claim 1, wherein each profile of a bucket holder dovetail slot comprises a fir tree shape having a plurality of hooks interspersed with a plurality of necks that engage with a dovetail of one of the turbine buckets, each of the plurality of hooks having a substantially planar contact surface that engages with a dovetail of one of the turbine buckets.

6. The fixture of claim 1, wherein the turbine bucket holder includes a portion that is separated from a dovetail of the turbine bucket upon the turbine bucket holder engaging with a dovetail of the turbine bucket, thereby defining a pocket that protects a portion of the dovetail slot of the turbine bucket holder.

7. The fixture of claim 1, wherein the bucket holder dovetail slot of each of the plurality of turbine bucket holders is positioned in axial alignment with a respective one of the plurality of dovetail slots of the rotor wheel along a rotor axis of the turbomachine.

8. The fixture of claim 1, wherein each of the plurality of dovetail slots of the spacer wheel receiving a dovetail of one of the plurality of turbine bucket holder is positioned in axial alignment with a respective one of the plurality of dovetail slots of the rotor wheel along a rotor axis of the turbomachine.

* * * * *